United States Patent [19]

Arthur

[11] Patent Number: 5,258,600
[45] Date of Patent: Nov. 2, 1993

[54] PROCESS FOR WELDING THERMALLY AND/OR MECHANICALLY TREATED METAL CONDUITS

[75] Inventor: Timothy T. Arthur, New Orleans, La.

[73] Assignee: Exxon Production Research Company, Houston, Tex.

[21] Appl. No.: 860,947

[22] Filed: Mar. 31, 1992

[51] Int. Cl.$^5$ .............................................. B23K 9/23
[52] U.S. Cl. .................... 219/137 R; 219/61; 219/76.12
[58] Field of Search ............ 219/61, 76.12, 76.14, 219/76.15, 137 R, 137 WM

[56] References Cited

U.S. PATENT DOCUMENTS

| | | | |
|---|---|---|---|
| 2,060,765 | 11/1936 | Welch et al. | 113/112 |
| 3,745,322 | 7/1973 | Ito et al. | 219/137 |
| 4,049,186 | 9/1977 | Hanneman et al. | 219/61 |

OTHER PUBLICATIONS

Profile, Exxon Company U.S.A., Jul. 1991, p. 5.
Wildcat, Exxon Company, U.S.A., Fall 1991, p. 3.

Primary Examiner—Clifford C. Shaw
Attorney, Agent, or Firm—Kelly A. Morgan

[57] ABSTRACT

A process for welding mechanically and/or thermally treated alloy pipes to achieve the full tensile capacity of the unwelded base alloy across the welded pipe joint is disclosed. The process comprises welding the pipes together at the beveled pipe ends to form a cap of weld metal. The weld metal cap overlaps that portion of the heat-affected zone which is created in the base alloy adjacent to the bevel of each pipe during welding. To further increase the tensile capacity of the welded joint, a low-heat buffer bead layer can be deposited on the outer surface of each pipe proximate the outer edge of each bevel, prior to depositing the weld metal between the bevels. The buffer bead layers serve to reduce the thickness of that portion of the heat-affected zone which is formed in the base alloy under each toe of the weld metal cap (upon formation of the weld metal cap) to a level having no significant reduction in the overall tensile capacity of the welded joint. In both instances, the weld metal cap is used to reinforce the base alloy over that portion of the heat-affected zone formed generally adjacent to the bevel of each pipe, thereby ensuring that the plane of weld joint failure is located predominantly in the region of the base alloy which has not suffered loss of strength due to welding heat, rather than in the weaker heat-affected zone or in the weaker weld metal itself. The resulting welded pipe joint will have a tensile capacity which is at least substantially equal to the tensile capacity of the unwelded base alloy.

22 Claims, 3 Drawing Sheets

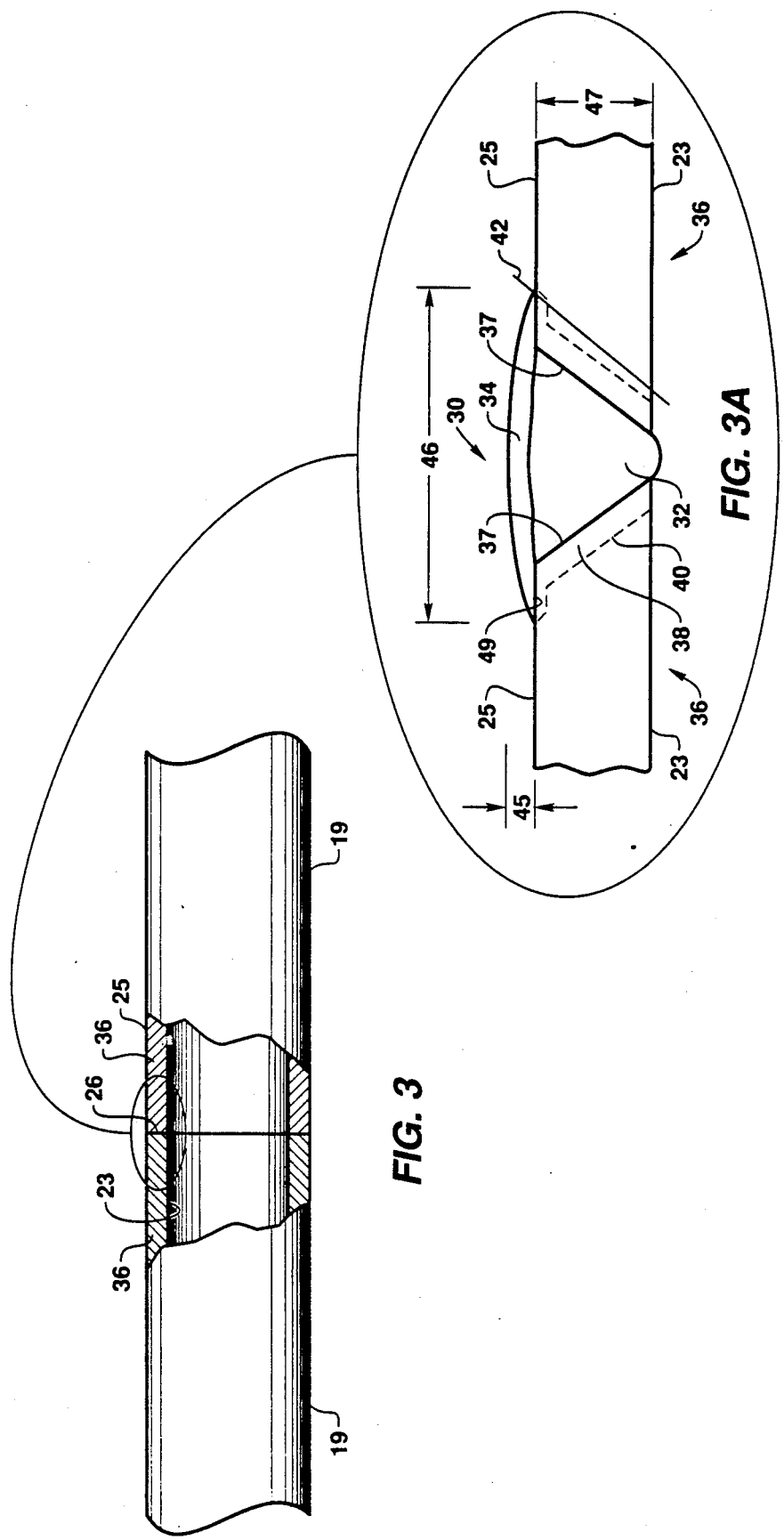

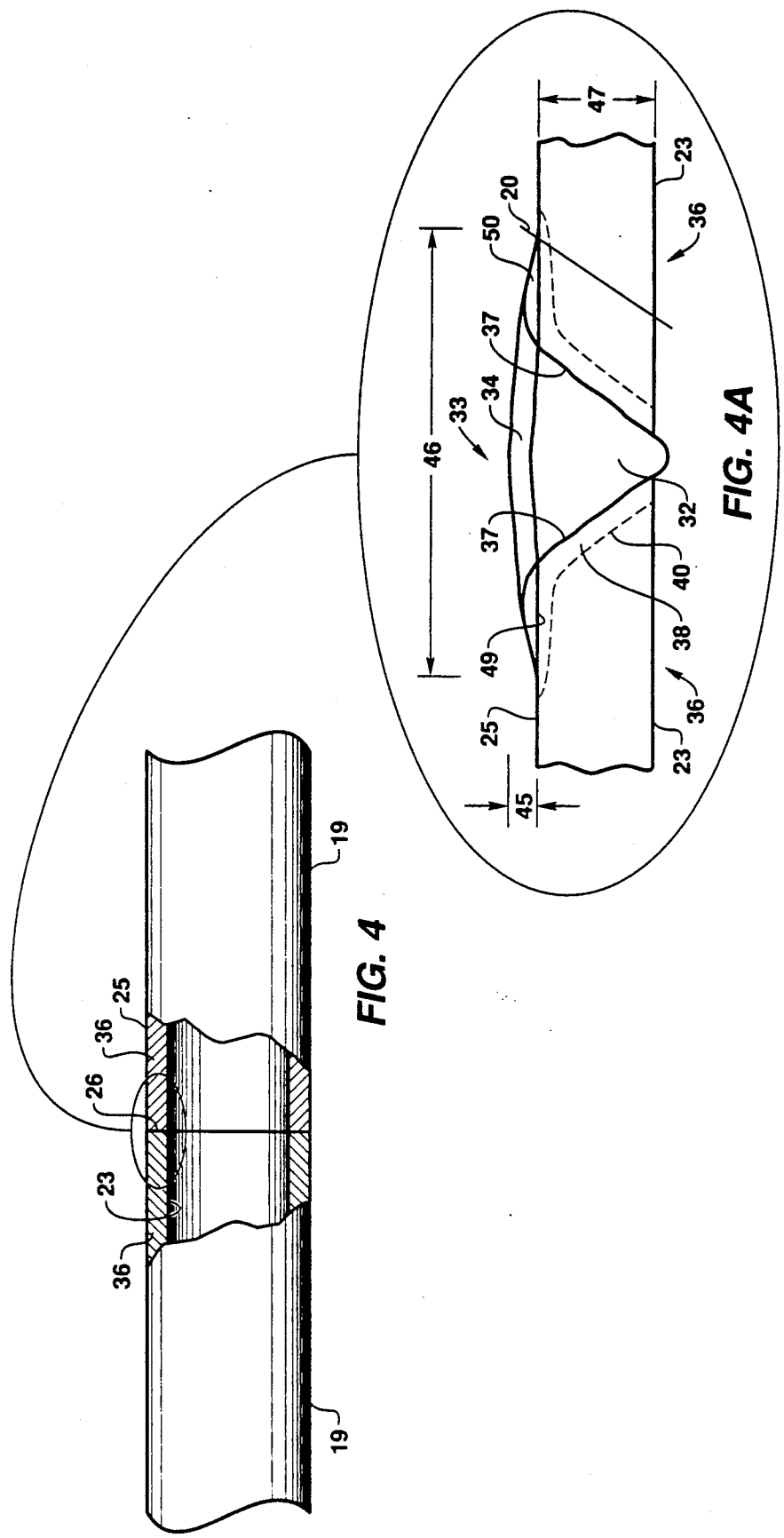

PROCESS FOR WELDING THERMALLY AND/OR MECHANICALLY TREATED METAL CONDUITS

FIELD OF THE INVENTION

The invention relates generally to the field of welding metal conduits strengthened by thermal and/or mechanical treating methods. More specifically, but not by way of limitation, the invention pertains to a process for welding alloy pipes to form a welded joint having a tensile capacity which is at least substantially equal to the tensile capacity of the unwelded base alloy.

BACKGROUND OF THE INVENTION

High pressure metal pipe applications used in the oil and gas industry will often benefit from the use of high strength alloys to resist the stresses caused by the internal pressure of fluid flowing through the pipe. The mechanical or yield strength of an alloy can be increased by various thermal or mechanical processes or a combination thereof. Examples of such processes include: cold-working or drawing for mechanical strengthening; precipitation hardening or quenching and tempering for thermal strengthening; and control-rolling plus accelerated cooling for combined thermo-mechanical strengthening.

The yield strength of an alloy represents the stress below which deformation of the alloy is entirely "elastic"; when the alloy is stressed in the elastic region, the alloy will return to its original shape when the stress is removed, and there will be no permanent deformation. In high pressure pipe applications, it is desirable to increase the yield strength of the alloy and thereby increase the elastic region in which stress resulting from pressure of the fluid flowing in the pipe will not result in permanent deformation of the alloy.

One specific example of a process for increasing the yield strength of an alloy is a plastic deformation process commonly known as "cold-working". Alloys are "plastically deformed" when they are deformed to the extent that they do not return to their original shape when the stress is removed. A number of changes occur in the microstructure of an alloy when it is plastically deformed; during deformation, each individual grain must "give" to produce the anticipated overall deformation. This deformation causes each grain to become stronger and, therefore, more difficult to further deform. With a cold-working process, plastic deformation is performed below the critical temperature of the alloy (i.e., the temperature at which grain recrystallization initiates) and there is a gradual increase in the hardness or yield strength of the alloy and a decrease in its ductility. For example, the yield strength of nickel-based alloys, which are often used in pressure pipe applications, can be increased by about 50 ksi-100 ksi with this cold-working deformation process. Typically, the resulting yield strength will be about 4 times the yield strength of the untreated alloy.

By the nature of their fabrication, pre-strengthened pipe applications will contain a considerable number of welded joints, each of which typically has a tensile capacity lower than that of the base alloy. As described further below, when an alloy is welded by conventional practices, the strength of the base alloy is locally, but permanently, reduced by the welding heat, which results in a welded joint which is substantially weaker than the unwelded, pre-strengthened, base alloy. Accordingly, the benefit of increasing the tensile capacity of the base alloy using thermal or mechanical strengthening methods is substantially decreased because of the weakness of the welded joint resulting from the welding process.

The process of welding will produce a heat-affected zone in the alloy adjacent to the weld metal. The heat-affected zone is that portion of the alloy which has not been melted, but whose mechanical properties or microstructure have been altered by the heat of welding. FIG. 1 is a schematic of a standard welded joint 2 having a weld metal 4, a base alloy 6 which has been thermally or mechanically strengthened, and a heat-affected zone 8. If the chemical composition of the weld metal 4 is essentially the same as that of the base alloy 6 (prior to strengthening of the base alloy 6), then the weld metal 4 of such a welded joint 2 will be the weakest, the heat-affected zone 8 will be stronger than the weld metal 4 but weaker than the base alloy 6, and the base alloy 6 will be the strongest. If the chemical composition of the weld metal 4 and the base metal 6 are not essentially the same, the heat-affected zone 8 will, in some instances, be weaker than the weld metal 4. But, in either instance, the base alloy 6, if thermally or mechanically strengthened prior to welding, will usually be stronger then either the weld metal 4 or the heat-affected zone 8.

With a standard welded joint 2, having a mechanically or thermally strengthened base alloy 6, the welded joint 2 will typically fail along a plane 10 which is located in the weld metal 4. Accordingly, failure of the welded joint 2 will occur in the weld metal 4 and thus at a tensile load below that which could otherwise be sustained by the unwelded, pre-strengthened, base alloy 6. For example, when two nickel-based, cold-worked, alloy pipes, each having a tensile capacity of about 140 ksi (after cold-working), are welded together using a weld metal 4 having a tensile capacity of about 120 ksi, to form a standard welded joint 2, the welded joint 2 will typically fail at the tensile capacity of the weld metal 4. The tensile capacity of the welded joint 2, at the plane of failure 10 located in the weld metal 4, would therefore be about 86% of the tensile capacity of the unwelded, pre-stengthened, base alloy 6.

When welding two pipes, a cap of excess weld metal may be formed which is often considered a by-product of the welding process. With standard welding practices, there is no minimum cap height required; indeed, welding codes and practices often limit the maximum cap height (e.g. to ⅛"). As described further below, although a high-cap welded joint (as depicted in FIG. 2) may have a tensile capacity which is greater than the tensile capacity of a standard welded joint 2, when the base alloy has been strengthened by thermal and/or mechanical treating methods, it is not recommended that a high cap of excess weld metal be relied upon to contribute to the load-carrying capacity of the welded joint.

The theoretical plane of failure for a welded joint having a "high-cap", which is not removed after welding, is illustrated in FIG. 2. The high-cap welded joint 17 depicted in FIG. 2 consists of weld metal 21, high-weld cap 24 and a portion of the pre-strengthened base alloy 16, on either side of the weld metal 21 including at least the heat-affected zone 20. The outer boundary of the heat-affected zone 20 is indicated by dashed lines 18. Assuming that the chemical composition of the weld metal 21 essentially matches the chemical composition of the base alloy 16 (prior to thermal or mechanical strengthening), then the welded joint 17 will, in the best case, fail along the plane 22 located in the heat-affected zone 20. The high weld cap 24 will theoretically push the plane of failure 22 out of the weaker weld metal 21 and into the stronger heat-affected zone 20. However, as with the standard welded joint 2 shown in FIG. 1, failure along plane 22 (plane 10 in FIG. 1) will still occur at a tensile capacity below that which could otherwise be sustained by the unwelded, pre-strengthened, base alloy 16 (base alloy 6 in FIG. 1). For example, When two cold-worked, nickel-based, alloy pipes, each having a tensile capacity of about 140 ksi (after cold-working) are welded together, using a weld metal 21 having a tensile capacity of about 120 ksi, to form a high-cap welded joint 17, the welded joint 17 will theoretically fail at the tensile capacity of the heat-affected zone 20 (about 130 ksi). However, this will only occur if the plane of failure 22 is actually located in the heat-affected zone 20. The tensile capacity of such a welded joint 17 would therefore be about 93% of the unwelded base alloy 16 tensile strength.

As discussed above, the increased tensile capacity of the high-cap welded joint 17 (FIG. 2), in comparison to the standard welded joint 2 (FIG. 1), arises because the high-weld cap 24 will theoretically force the plane of failure 22 into the stronger (with respect to the weld metal 21) heat-affected zone 20. Whereas, the plane of failure 10 of the standard welded joint 2 will typically reside in the weaker (with respect to the heat-affected zone 8) weld metal 4. Notwithstanding this increase in tensile capacity, it would be difficult to achieve reliable and consistent strength through the plane of failure 22 in the heat-affected zone 20 using a high-weld cap 24, because of the high degree of variation in welding parameters which impact the size and extent of the heat-affected zone 20. More specifically, variation in each welder's methods and in welding parameters, such as heat, amperage and voltage, make it impractical and essentially impossible during actual production welding to predict the strength through the plane of failure 22 located in the heat-affected zone 20.

In addition to the foregoing, when a high-cap welded joint 17 is formed with two pipes having a base alloy 16 which has been strengthened by thermal and/or mechanical treating methods, the tensile strength in the heat-affected zone 20 will still be less than the tensile strength of the pre-strengthened base alloy 16. Accordingly, the area of lowest strength will still be in the high-cap welded joint 17, and in a typical weld design it is common practice to attempt to have the welded joint be at least as strong as the base alloy. For the reasons set forth above, a high-weld cap 24 is not recommended to increase the tensile capacity of a welded joint when the base alloy has been strengthened by thermal and/or mechanical treating methods. Furthermore, a high-weld cap 24 is usually not used with unstrengthened alloys (such as unstrengthened carbon steel) because the weld metal used is usually stronger than the unstrengthened base alloy. A high-cap weld is therefore usually not needed to increase the strength of the base alloy.

As discussed above, neither the process of forming the standard welded joint 2 (FIG. 1) nor the process of forming the high-cap welded joint 17 (FIG. 2) will reliably result in a welded joint having a tensile capacity which is at least substantially equal to the tensile capacity of an unwelded, pre-stengthened, base alloy. With both of the above described processes, the benefit of increasing the tensile capacity of the base alloy using thermal or mechanical strengthening methods is substantially decreased because of the weakness of the welded joint resulting from the welding process. As a result, mechanical joining processes (such as connections using screw threads) rather than welding processes, have heretofore been used to join pipes having thermally and/or mechanically strengthened alloys when strength requirements for a particular application exist. Yet, mechanical joining processes are impractical for various pressure pipe applications where the connections are exposed to bending and other load conditions for which they are not designed (e.g. pipes used in subsea pipeline installations).

For the foregoing reasons, the need exists in the industry for a method for welding thermally and/or mechanically strengthened alloy conduits to produce a welded joint having a tensile capacity which is at least substantially equal to the tensile capacity of the unwelded, pre-strengthened, base alloy, thereby allowing the full strength of the base alloy to be developed throughout the welded joint of the conduits.

SUMMARY OF THE INVENTION

In one aspect, the present invention is a process for welding pre-strengthened conduits to form a welded joint having a tensile capacity which is at least substantially equal to the tensile capacity of the unwelded, base alloy of the conduits. Each conduit has an outer surface, an inner surface, and two ends, with at least one of the ends having a bevel formed thereon. The process comprises first positioning the conduits proximate each other such that the inner and outer surfaces are in respective axial alignment and the bevels are facing each other. A weld metal is then deposited between the bevels, whereby a first heat-affected zone portion is created in the base alloy of each conduit and is located generally proximate the bevels. A weld metal cap, which extends radially outwardly beyond the outer surface of each of the conduits, is then formed by depositing additional weld metal on the previously deposited weld metal and on a portion of each of the outer surfaces of the conduits. Depositing additional weld metal on the outer surfaces will create a second heat-affected zone portion in the base alloy under each of the toes of the weld metal cap. The weld metal cap formed should extend axially along each of the outer surfaces at least as far as the outer boundry of the first heat-affected zone portion.

In another aspect of the inventive process, a low-heat buffer bead layer can be deposited on the outer surface of each conduit proximate the outer edge of each bevel, prior to depositing the weld metal between the bevels. Each buffer bead layer will extend radially outwardly beyond the outer surface of each conduit. Upon aligning the conduits as set forth above, a weld metal is then deposited between the bevels, and the weld metal cap is formed to overlap a portion of each of the buffer bead layers and to overlap at least the outer boundry of the first heat-affected zone portion. The buffer bead layers serve to minimize the weld heat conducted to the base alloy located under the toes of the weld metal cap, thereby minimizing the second heat-affected zone portion which is created during formation of the weld metal cap.

The process for forming an alloy conduit having an increased yield strength for connection with a second alloy conduit comprises first increasing the yield strength of the alloy conduit by any appropriate method, and then forming a bevel, having an outer edge and an inner edge, on at least one end of the strengthened conduit. A buffer bead layer is then deposited on the outer surface of the conduit generally proximate the outer edge of the bevel.

BRIEF DESCRIPTION OF THE DRAWINGS

The advantages of the various embodiments of the present invention will be better understood by referring to the following detailed description and the attached drawings in which:

FIG. 3 illustrates two pipes welded together using a first embodiment of the process of the present invention.

FIG. 3A illustrates the welded pipes of FIG. 3, and shows a welded pipe joint formed by a first embodiment of the process of the present invention.

FIG. 4 illustrates two pipes welded together using a second embodiment of the process of the present invention.

FIG. 4A illustrates the welded pipes of FIG. 4, and shows a welded pipe joint formed by a second embodiment of the process of the present invention where the welded joint has a buffer bead layer deposited on the outer surface of each pipe proximate the outer edge of the bevel of each pipe.

DESCRIPTION OF THE PREFERRED EMBODIMENTS

Figure 1:
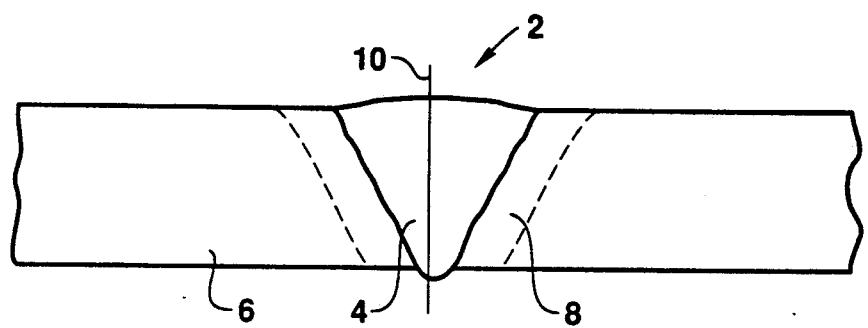
FIG. 1 illustrates the heat-affected zone and plane of failure for a typical standard welded joint.
Figure 2:
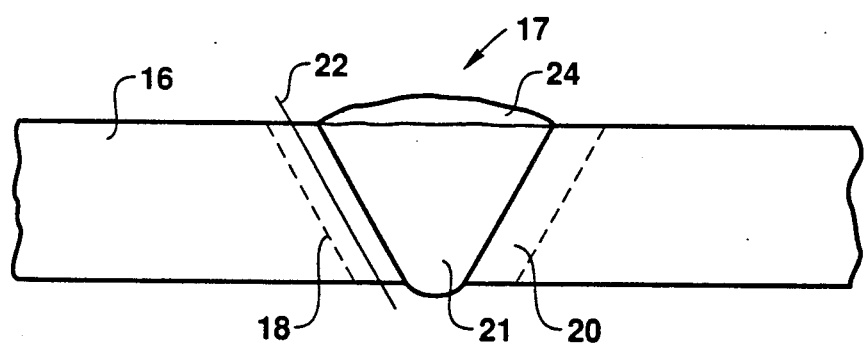
FIG. 2 illustrates the heat-affected zone and plane of failure for a welded joint having a high cap of weld metal.

A process for welding mechanically and/or thermally srengthened alloy conduits to form a welded joint having a tensile capacity which is at least substantially equal to the tensile capacity of the unwelded, base alloy is disclosed. It will be understood that although the various embodiments of the present invention will be described in connection with a process for welding cold-worked alloy pipes, the inventive process is applicable to welding alloy conduits (not just pipes) strengthened by any mechanical or thermal treating method (not just by cold-working). As previously described, examples of other strengthening processes include: drawing for mechanical strengthening; precipitation hardening or quenching and tempering for thermal strengthening; and control-rolling plus accelerated cooling for combined thermal-mechanical strengthening. Accordingly, although the description of the various embodiments of the present invention set forth below is directed to cold-worked, alloy pipes, all such other uses are intended to be included within the scope of the invention.

FIGS. 3 and 4 illustrate two cold-worked alloy pipes 19 which have been welded together using a first and second embodiment, respectively, of the process of the present invention. Each pipe 19 has a pipe wall 36 bounded by an inner surface 23 and an outer surface 25. Each of said pipes 19 also has two ends with one end 26 having a bevel 37 formed thereon (shown in FIGS. 3A and 4A). FIG. 3A illustrates a welded joint 30 resulting from a first embodiment of the process of the present invention. The welded joint 30 consists of the weld metal 32, a weld metal cap 34, and a portion of the base alloy of the pipes 19 on either side of weld metal 32, including at least the heat-affected zone 38 produced during welding. A substantial portion of the heat-affected zone 38 is located generally adjacent to the bevels 37 of the pipes 19, and the remaining portion of the heat-affected zone 38 is located below the toes 49 of the weld metal cap 34. The outer boundary of the heat-affected zone 38 is indicated by dashed lines 40.

In a preferred embodiment, the inventive process for welding cold-worked alloy pipes 19 (as shown in FIGS. 3 and 3A) to form a welded joint 30 having a tensile capacity which is at least substantially equal to the tensile capacity of the unwelded, base alloy of the pipes 19 comprises positioning the first and the second pipes 19 proximate each other such that the bevels 37 are facing each other and the inner surfaces 23 and the outer surfaces 25 of each pipe 19 are in respective axial alignment (i.e. the outer surfaces 25 of each of the pipe walls 36 are axially aligned and the inner surfaces 23 of each of the pipe walls 36 are axially aligned). Weld metal 32 is then deposited between the bevels 37 and a weld metal cap 34 is formed which extends radially outwardly beyond the outer surfaces 25 of pipes 19. Weld metal cap 34 is formed on a portion of each of the outer surfaces 25 such that the weld metal cap 34 extends axially along the outer surfaces 25 at least as far as the outer boundary 40 of that portion of the heat-affected zone 38 which is formed generally adjacent the bevels 37. The weld metal cap 34 is formed by depositing a weld metal 32 on the previously deposited weld metal 32 and on the outer surfaces 25 of the pipes 19.

As discussed previously, welding of cold-worked alloy pipes 19 using conventional welding techniques such as Gas Tungsten Arc Welding (GTAW) will result in a reduced material strength in the heat-affected zone 38 developed during the welding process. In addition, the strength of the weld metal 32 used will typically be weaker than the strength of the cold-worked, unwelded, base alloy of the pipes 19. The inventive welding process described above solves the problems of reduced material strength of the heat-affected zone 38 and of the weaker weld metal 32 by adding a reinforcing weld metal cap 34 which extends over a portion of the outer surface 25 of each pipe 19 and over that portion of the heat-affected zone 38 which is located generally adjacent to the bevels 37. As shown in FIG. 3A, the plane of failure 42 for the welded joint 30 will be located substantially outside the heat-affected zone 38 in the base alloy of pipes 19 and will pass through only that portion of the heat-affected zone 38 which is located under the toes 49 of the weld metal cap 34. The plane of failure 42 will no longer be substantially located either in the weaker weld metal 32 or in the weaker heat-affected zone 38, but will be predominately located in the stronger, unwelded, cold-worked, base alloy of the pipes 19. As a result, the tensile capacity of the welded joint 30 will be at least substantially equal to the tensile capacity of the unwelded, cold-worked, base alloy of the pipes 19. Preferably, the tensile capacity of the welded joint 30 will be at least 95% of the tensile capacity of the base alloy of the pipes 19. For example, when two nickel-based, cold-worked, alloy pipes 19, each having a tensile capacity of about 140 ksi (after cold-working), are welded together using a nickel-based weld metal 32 having a tensile capacity of about 120 ksi to form a weld metal cap 34, the welded joint 30 will typically fail at around 136 ksi. The tensile capacity of the welded joint 30 at the plane of failure 42 located substantially outside the heat-affected zone 38 would therefore be around 97% of the tensile capacity of the unwelded, cold-worked base alloy.

The height 45 and width 46 of the weld metal cap 34 will depend on: the pipe wall thickness 47 of the alloy pipes 19 to be joined; the anticipated width of the weld heat-affected zone 38; and the tensile capacity of both the weld metal 32 and the base alloy. The thickness of the welded joint 30 measured through a plane (not shown) located at the center of the welded joint 30 is such that the tensile capacity measured at that center plane is equal to or greater than the tensile capacity of pipe 19 measured at a plane (not shown) located through the unwelded, base alloy of pipe 19. The weld metal cap 34 must be built up high enough to push the plane of failure 42 out of the weld metal 32 and into the base alloy of pipes 19. The height 45 of the weld metal cap 34 therefore depends on the strength of the weld metal 32 relative to the strength of the base alloy of pipes 19 and the thickness 47 of the pipes 19. Preferably, the minimum height 45 of the weld metal cap 34 will be equal to the thickness 47 of the pipe wall 36 increased by the percentage that the tensile strength of the base alloy is greater than the tensile strength of the weld metal 32 prior to welding $$h_{wc} = t_{ba} \left( \frac{TS_{ba}}{TS_{wm}} \right) - t_{ba},$$

where: $h_{wc}$=height 45 of weld metal cap 34; $t_{ba}$=thickness 47 of base alloy; $TS_{ba}$=tensile strength of base alloy; and $TS_{wm}$=tensile strength of weld metal 32]. For example, if the weld metal 32 tensile strength is about 120 ksi and the base metal tensile strength is about 140 ksi, with a pipe wall thickness 47 of about 1", the height 45 of weld metal cap 34 will preferably be about 0.167"

$$\left( h_{wc} = 1'' \left( \frac{140 ksi}{120 ksi} \right) - 1'' = 0.167'' \right).$$

It should be noted that increasing the height 45 of the weld metal cap 34 beyond that necessary to form a plane of failure 42 located predominantly in the base alloy of the pipes 19 results in no strength advantage. The minimum width 46 of the weld metal cap 34 will preferably be adequate so that a plane of failure 42 on a 45° angle through a toe 49 of the weld metal cap 34 will not extend into any part of that portion of the heat-affected zone 38 formed generally adjacent the bevels 37.

The selection of the welding rod diameter and other particulars of the welding consumables for the root, hot, and fill and passes is dependent upon the chemistry of the base alloy of the pipes 19, the corrosivity of the adjacent environment, and other particulars of the application and can be determined using methods known to those skilled in the art. The weld metal 32 will often be selected to be compatible with the base alloy of the pipes 19 and to have a high strength in order to minimize the height 45 necessary for the weld metal cap 34.

Another embodiment of the present inventive process for welding cold-worked, alloy pipes to form a welded joint 33 having a tensile capacity which is at least substantially equal to the tensile capacity of the unwelded, cold-worked, base alloy is illustrated in FIGS. 4 and 4A. FIG. 4A illustrates a welded joint 33, which includes a weld metal 32, a weld metal cap 34, buffer bead layers 50, and a heat-affected zone 38. The heat-affected zone 38 includes at least that portion of the base alloy of pipes 19 that has been altered by the welding process and is located generally adjacent to the bevels 37 of pipes 19 and generally below the toes 49 of the weld metal cap 34. The outer boundary of the heat-affected zone 38 is shown by dashed lines 40. The process of welding pipe sections 19 to form the welded joint 33 includes first depositing a low-heat buffer bead layer 50 on the outer surface 25 of each of the pipes 19 proximate the outer edge of each of the bevels 37 using a small diameter filler rod. The buffer bead layers 50 will extend radially outwardly beyond the outer surface 25 of each pipe 19 and will form a "heat-affected zone 38 minimizing layer" on the outer surfaces 25. The buffer bead layers 50 will also form a visible height objective for subsequent deposition of weld metal 32. The next step in the process is to position the first and second pipes 19 proximate each other such that the bevels 37 are facing each other and the inner surfaces 23 and outer surfaces 25 of the pipes 19 are in respective axial alignment. When the pipes 19 to be joined are of different thicknesses, suitable adjustments for alignment can be made by those skilled in the art; internal alignment is usually maintained, if necessary, by prior internal chamfering of the pipe 19 having the smaller inside diameter.

After positioning the pipes 19, the pipes 19 are then welded to form a weld metal cap 34 which overlaps a portion (preferably one-half) of the buffer bead layers 50 and which overlaps that portion of the heat-affected zone 38 located generally adjacent to the bevels 37 of the pipes 19. The weld metal cap 34 will extend radially outwardly beyond the outer surfaces 25 of the pipes 19 and will extend axially along said buffer bead layers 50 at least as far as the outer boundary 40 of that portion of the heat-affected zone 38 formed adjacent the bevels 37. Welding of the two pipes 19 is accomplished by depositing a weld metal 32 between the bevels 37 of the pipes 19, on the previously deposited weld metal 32, and on a portion of the buffer bead layers 50 to form the weld metal cap 34.

The welding process described above will result in a welded joint 33 having a tensile capacity which is at least substantially equal to the tensile capacity of the unwelded base alloy of each of the pipes 19 because (as shown in FIG. 4A) the plane of failure 20 of the welded joint 33 will be located predominantly in the base alloy of pipes 19 and thus substantially outside that portion of the heat-affected zone 38 which is located generally adjacent to the bevels 37. Preferably, the tensile capacity of the welded joint 33 will be at least about 95% of the tensile capacity of the unwelded base alloy of pipes 19 and more preferably about 99% of the tensile capacity of the base alloy of pipes 19. As with the previously described welding process, the plane of failure 20 is no longer substantially located in the weaker weld metal 32 or in the weaker heat-affected zone 38, but is predominately located in the stronger, unwelded, cold-worked, base alloy of the pipes 19.

The buffer bead layers 50 minimize the heat input into the base alloy of the pipes 19 under the toes 49 of the weld metal cap 34 upon welding, thereby minimizing the final thickness of that portion of the heat-affected zone 38 formed under each toe 49. The buffer bead layers 50 will also serve to improve the geometric consistency of the weld metal cap 34, particularly as regards achieving the minimum height 45 of the weld metal cap 34. By decreasing that portion of the heat-affected zone 38 formed under the toes 49 of the weld metal cap 34, the buffer bead layers 50 help to ensure that the tensile capacity of the welded joint 33 is substantially equal to the tensile capacity of the unwelded, pre-strengthened, base alloy. For example, when two nickel-based, cold-worked alloy pipes, each having a tensile capacity of about 140 ksi (after cold-working), are welded together using a nickel-based weld metal having a tensile capacity of about 120 ksi to form a weld metal cap 34 having buffer bead layers 50 (as depicted in FIG. 4A), the welded joint 33 will typically fail at around 139 ksi. The tensile capacity of the welded joint at the plane of failure 20 located substantially outside the heat-affected zone 38 is therefore around 99% of the base alloy tensile capacity.

The buffer bead layers 50 are preferably welded to each pipe 19 prior to joining of the pipes 19 using a conventional process such as GTAW in a manner which results in minimal heat input into the base alloy of each pipe 19. Typically, the buffer bead layers 50 are deposited at a lower weld heat amperage and voltage than used in depositing the weld metal 32, thus reducing the associated heat-affected zone (not shown in drawings) created upon deposition of the buffer bead layers 50. To achieve a lower weld heat input when depositing the buffer bead layers 50, welding procedures known to those skilled in the art will be used (e.g. low amperage and small filler-metal diameters). Prewelding can be accomplished using a small diameter filler rod in combination with normally associated weld parameters. The filler rod diameter will normally be less than that used for the filled passes of the weld.

Preferably, the thickness of the buffer bead layers 50 will be approximately two thirds of the minimum height 45 of the weld metal cap 34, and the width of the buffer bead layers 50 will be such that a plane of failure 20 through the toe of a buffer bead layer 50 never extends into that portion of the heat-affected zone 38 formed generally adjacent the bevels 37. The width of buffer bead layer 50 will preferably be about ⅜ inch for base alloy thicknesses 47 of up to about ½ inch. Larger buffer bead layer widths are appropriate for thicker materials. Pre-welding of the buffer bead layers 50 can be performed at a fabrication facility under controlled conditions (i.e. shielded from rain, wind, etc.) or in the field. The height 45 and width 46 of the weld metal cap 34 used in forming welded joint 33 will be determined as set forth in the description of the previous embodiment; however, the weld metal cap 34 will preferably overlap one-half of each buffer bead layer 34.

A process for forming an alloy pipe 19 having an increased yield strength comprises first increasing the yield strength of the alloy pipe 19 using any number of thermal and/or mechanical processes as previously described. After increasing the yield strength of the alloy pipe 19, a bevel 37 is formed on at least one end of the alloy pipe 19, and a buffer bead layer 50 is then deposited along the outer surface 25 of the pipe 19 generally proximate the outer edge of the bevel 37. As noted above, pre-welding of the buffer bead layer 50 can be performed at a fabrication facility or in the field. The alloy pipe 19 disclosed above is then ready for welding to another such prepared pipe 19.

It should be noted that the various embodiments of the inventive process described above are particularly useful in pipe applications where there is a benefit or need to decrease pipe wall thickness. More specifically, it is particularly useful when expensive alloys, such as nickel-based alloys, are used. Typically, a nickel-based alloy will have a tensile strength of about 120 ksi with a yield strength of about 30 ksi and will therefore have a low yield to tensile ratio. As a result, a thicker, and thus more expensive, pipe wall will be necessary, particularly in high pressure applications. As previously discussed, an alternative to strengthening the pipe by increasing the wall thickness is to cold-work the alloy (or otherwise mechanically or thermally treat the alloy) and thereby increase the yield to tensile ratio. The wall thickness of such a treated pipe will therefore be decreased and thus the cost of the pipe will be decreased. However, with standard practices, a problem still exists due to the weaker welded joint resulting from welding. Yet, with the embodiments of the inventive process, the benefit to pre-strengthening (such as by cold-working) a nickel-based alloy will not be decreased by the weaker welded joint arising from welding. However, with less expensive alloys and/or with alloys having higher yield to tensile ratios (such as carbon steel), it is often less expensive to increase the pipe wall thickness than to cold-work or otherwise pre-strengthen the alloy.

EXAMPLE

Documentation of one successful use of the process of the present invention is set forth below. More specifically, a Procedure Specification Record No. CRA-01 and a Procedure Qualification Record CRA-01-A tested pursuant to API Standard 1104 are set forth below. This type of documentation and the terminology used therein are well known to those skilled in the art.

API STANDARD 1104
PROCEDURE SPECIFICATION RECORD NO. CRA-01

A. PROCESS/ES: GTAW
B. MATERIAL: 110 GR. HASTELLOY G-3
C. DIAMETER AND WALL THICKNESS: 4.5 × 291
D. JOINT DESIGN: SINGLE VEE ZERO LAND
E. FILLER METAL AND NUMBER OF BEADS: I-625 5-8 PASSES
F. ELECTRICAL OR FLAME CHARACTERISTICS: DCSP. 70-135 AMPS
G. POSITION: 5-G
H. DIRECTION OF WELDING: UP-HILL
I. NUMBER OF WELDERS: 1 ON PROCEDURE & 2 ON PRODUCTION WELDS
J. TIME LAPSE BETWEEN PASSES: N/A
K. TYPE OF LINE-UP CLAMP: EXTERNAL WHEN REQUIRED
L. REMOVAL OF LINE-UP CLAMP: ANYTIME
M. CLENAING: ACETONE
N. PREHEAT, STRESS RELIEF: N/A
O. SHIELDING GAS AND FLOW RATE: SHIELD GAS 20-30 CFH ARGON - HEL. 90/10

-continued

API STANDARD 1104
PROCEDURE SPECIFICATION RECORD NO. CRA-01

P. BACKING: BRASS BACKING WITH 35-45 CFH PURGE
Q. SPEED OF TRAVEL: 5-3 I.P.M.
R. SKETCHES AND TABULATIONS ATTACHED: N/A
TESTED: BY ATCO INC.
APPROVED: TIM ARTHUR (EXXON)
WELDER: BENNY SANCHEZ
WELDING SUP.: ALLEN THIBODEAUX

COMPANY NAME EXXON U.S.A.
Procedure Qualification Record No. CRA-01-A    Date 3-6-91
WPS NO. CRA-01
Welding Process(es) GTAW
Types (manual, automatic, semi-auto) MANUAL

| PASS | AMPS | VOLTS | ROD/WIRE SIZE | I.P.M. | I.P. TEMP | KJ/IN. |
|------|------|-------|---------------|--------|-----------|--------|
| 1    | 75   | 11    | 3/32          | 1.6    | 70        | 30.9   |
| 2    | 90   | 11    | 3/32          | 2.6    | 70        | 22.8   |
| 3    | 125  | 13    | 3/32          | 2.2    | 70        | 44.3   |
| 4    | 125  | 13    | 3/32          | 2.2    | 70        | 44.5   |
| 5    | 125  | 13    | 3/32          | 1.7    | 70        | 57.4   |
| 6    |      |       |               |        |           |        |
| 7    |      |       |               |        |           |        |
| 8    |      |       |               |        |           |        |
| 9    |      |       |               |        |           |        |
| 10   | 70   | 10    | 3/32          | 1.5    | 70        | BUFFER PASS |

BASE METALS
Material Spec. B-444 PIPE
Type 110 GR. HASTELLOY
P-no.        to P-no. 43
Thickness 4.5 O.D.
Other

POSTWELD HEAT TREATMENT
Temperature NONE
Time
Other

GAS
Type of gas or gases AR/HEL. SHIELDING
Composition of gas mixture 90/10
Other UHP ARGON PURGE USED WITH BRASS BACKING. PURGE GAS CFH TO EXCEED SHIELD GAS C.F.H.

FILLER METALS
Fold_____ analysis A no. N/a
Size_____ rod 3/32
Filler metal I-625 F. no. 43
SFA specification A5.14
AWS classification NI.CR.Mo.-3
Other

ELECTRICAL CHARACTERISTICS
Current DCEN
Polarity DCSP
Amps 75-125
Other

POSITION
Position of groove 5-G
Weld progression (uphill/downhill) UP
Other

JOINT DESIGN
(see FIG. 3B)

PREHEAT
Preheat temp. NONE
Interpass temp. N/A
Other WATER QUENCHED

As described above, the various embodiments of the present invention satisfy the need for a process for welding thermally and/or mechanically treated metal conduits to develop a welded joint having a tensile capacity which is at least substantially equal to the tensile capacity of the unwelded, base alloy of the conduits. It should be understood that the invention is not to be unduly limited to the foregoing which has been set forth for illustrative purposes. Various modifications and alterations of the invention will be apparent to those skilled in the art without departing from the true scope of the invention, as defined in the following claims.

What is claimed is:

1. A process for welding first and second prestrengthened alloy conduits to form a welded joint having a tensile capacity which is at least substantially equal to the tensile capacity of the unwelded base alloy; each of said conduits having an outer surface, an inner surface, and two ends; at least one of said ends having a bevel formed thereon; said process comprising the steps of:

(a) positioning said first and second conduits such that said inner surfaces and said outer surfaces are in respective axial alignment and said bevels are facing each other;

(b) depositing a weld metal between said bevels whereby a first heat-affected zone portion is created in said base alloy of said conduits generally proximate said bevels; and (c) forming a weld metal cap extending radially outwardly beyond said outer surface of each of said conduits by depositing additional weld metal on said previously deposited weld metal and on a portion of each of said outer surfaces of said conduits, whereby a second heat-affected zone portion is created in said base alloy of said conduits generally below the toes of said weld metal cap; said weld metal cap extending axially along said outer surfaces at least as far as said outer boundary of said first heat-affected zone portion.

2. The process of claim 1 wherein said tensile capacity of said welded joint is at least about 95 percent of said tensile capacity of said unwelded base alloy.

3. The process of claim 1 wherein, prior to depositing said weld metal between said bevels, a buffer bead layer, extending radially outwardly beyond said outer surface of said conduit, is deposited on said outer surface of each of said conduits proximate the outer edge of each of said bevels and wherein said weld metal cap is formed by depositing addional weld metal on said previously deposited weld metal and on a portion of each of said buffer bead layers.

4. The process of claim 3 wherein the thickness of each of said buffer bead layers is approximately ⅓ of the maximum height of said weld metal cap.

5. The process of claim 3 wherein said buffer bead layers minimize the heat conducted to said base alloy located under said weld metal cap toes during formation of said weld metal cap.

6. The process of claim 5 wherein said minimization of said weld heat conducted to said base alloy located under each of said weld metal cap toes results in minimization of said second heat-affected zone portion.

7. The process of claim 1 wherein the thickness of said welded joint measured through a plane located at the center of said welded joint is such that said tensile capacity of said welded joint measured at said center plane is at least equal to said tensile capacity of said unwelded, base alloy of each of said conduits, measured at a plane located through said unwelded base alloy.

8. The process of claim 1 wherein said tensile capacity of said welded joint is at least substantially equal to said tensile capacity of said unwelded base alloy.

9. A process for welding first and second pre-strengthened alloy conduits to form a welded joint having a tensile capacity which is at least substantially equal to the tensile capacity of the unwelded base alloy; each of said conduits having an outer surface, an inner surface, and two ends; at least one of said ends having a bevel formed thereon; said process comprising the steps of:

(a) depositing a buffer bead layer, extending radially outwardly beyond said outer surface of said conduit, on said outer surface of each of said conduits proximate the outer edge of each of said bevels to form a heat-affected zone minimizing layer on said outer surfaces;

(b) positioning said first and second conduits such that inner and outer surfaces are in respective axial alignment and said bevels are facing each other;

(c) depositing a weld metal between said bevels whereby a first heat-affected zone portion is created in said base alloy of said conduits generally proximate said bevels; and (d) forming a weld metal cap extending radially outwardly beyond said outer surface of each of said conduits by depositing additional weld metal on said previously deposited weld metal and on a portion of each of said buffer bead layers, whereby a second heat-affected zone portion is created in said base alloy of said conduit generally below the toes of said weld metal cap; said weld metal cap extending axially on said buffer bead layers at least as far as said outer boundary of said first heat-affected zone portion.

10. The process of claim 9 wherein said tensile capacity of said welded joint is at least about 95 percent of said tensile capacity of said unwelded base alloy.

11. The process of claim 9 wherein the thickness of each of said buffer bead layers is approximately ⅓ of the minimum height of said weld metal cap.

12. The process of claim 9 wherein said buffer bead layers minimize the heat conducted to said base alloy, located under each of said weld metal cap toes, during formation of said weld metal cap.

13. The process of claim 12 wherein minimization of said weld heat conducted to said base alloy under each of said weld metal cap toes results in minimization of said second heat-affected zone portion created during formation of said weld metal cap.

14. The process of claim 9 wherein the thickness of said welded joint measured through a plane at the center of said welded joint is such that said tensile capacity of said welded joint measured at said center plane is at least equal to said tensile capacity of said unwelded base alloy measured at a plane located through said unwelded base alloy.

15. A process for welding first and second pre-strengthened nickel-based, alloy pipes to form a welded joint having a tensile capacity which is at least substantially equal to the tensile capacity of the unwelded base alloy; each of said pipes having an outer surface, an inner surface and two ends; at least one of said ends having a bevel formed thereon; said process comprising the steps of:

(a) depositing a buffer bead layer, extending radially outwardly beyond said outer surface of said conduit, axially on said outer surface of each of said pipes proximate the outer edge of each of said bevels to form a heat-affected zone minimizing layer on said outer surface of each of said pipes;

(b) positioning said first and second pipes such that said inner surfaces and said outer surfaces are in respective axial alignment and said bevels are facing each other;

(c) depositing a weld metal between said bevels whereby a first heat-affected zone portion is created in said base alloy of said pipes generally proximate said bevels; and (d) forming a weld metal cap extending radially outwardly beyond said outer surface of each of said pipes by depositing additional weld metal on said previously deposited weld metal and on a portion of each of said buffer bead layers, whereby a second heat-affected zone portion is created in said base alloy of said conduit generally below the toes of said weld metal cap; said weld metal cap extending axially along each of said buffer bead layers at least as far as said outer boundary of said first heat-affected zone portion.

16. The process of claim 15 wherein said weld metal cap overlaps about ½ of each of said buffer bead layers 17. The process of claim 15 wherein said tensile capacity of said welded joint is at least about 95 percent of said tensile capacity of said unwelded base alloy.

18. The process of claim 15 wherein the thickness of each of said buffer bead layers is approximately ⅓ of the minimum height of said weld metal cap.

19. The process of claim 15 wherein said buffer bead layers minimize the heat conducted to said base alloy, located under each of said weld metal cap toes, during formation of said weld metal cap.

20. The process of claim 19 wherein minimization of said weld heat conducted to said base alloy under each of said weld metal cap toes results in minimization of said second heat-affected zone portion created upon formation of said weld metal cap.

21. The process of claim 15 wherein the thickness of said welded joint measured through a plane at the center of said welded joint is such that said tensile capacity of said welded joint measured at said center plane is at least equal to said tensile capacity of said unwelded base alloy measured at a plane located through said unwelded base alloy of said pipes.

22. The process of claim 15 wherein each of said nickel-based alloy pipes has been pre-strengthened by plastically deforming each of said alloy pipes at a temperature below the critical temperature of said base alloy.

* * * * *